Jan. 20, 1953     H. G. TROTH ET AL     2,626,182
STOCK CHUTE AND ENDGATE
Filed Feb. 3, 1951

Inventor
HARRY G. TROTH AND
FAYE G. DAMMANN
By Willard S. Ground
Attorney

Patented Jan. 20, 1953

2,626,182

UNITED STATES PATENT OFFICE 2,626,182

STOCK CHUTE AND ENDGATE

Harry G. Troth and Faye G. Dammann,
Phoenix, Ariz.

Application February 3, 1951, Serial No. 209,232

8 Claims. (Cl. 296—61)

This invention pertains to improvements in stock chutes to facilitate loading and unloading of stock wagons or motor vehicles and the like.

One of the objects of this invention is to provide an improved combined end gate and stock chute for a motor vehicle adapted to carry livestock.

Another object of this invention is to provide an improved stock chute which is locked by novel hinge means both when in traveling position of the truck and when loading and unloading cattle from the truck.

Still another object of this invention is to provide an improved stock chute for a motor vehicle having two sides and a tail gate which may be instantly removed from or attached to the vehicle without the use of a single tool or the use of any loose or detachable parts which may become lost.

Still another object of this invention is to provide an improved stock chute comprising a tail gate and swinging side members in which the side members may be swung from a traveling position to a loading position and wherein novel hinge means automatically reposition the side members relative to the tail gate when in loading position.

Still another object of this invention is to provide an improved stock chute for a motor vehicle by which side members may be positioned above the side boards and rear fenders of the truck body when in traveling position and may be swung to loading position at the rear portion of the truck in conjunction with the tail gate while at all times remaining attached to the vehicle.

Further features and advantages of this invention will appear from a detailed description of the drawings in which.

Figure 1:
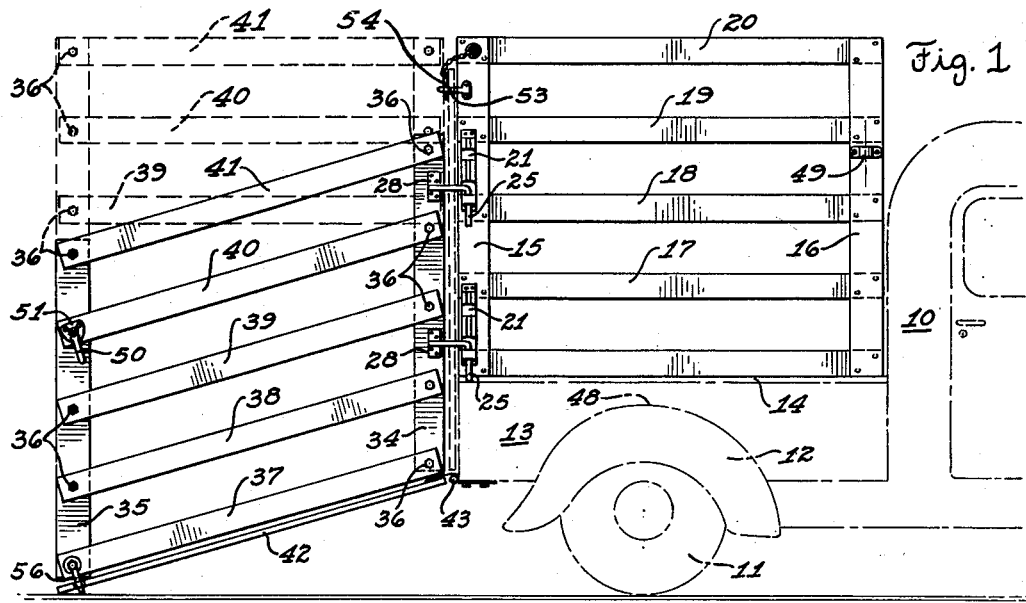
Fig. 1 is a fragmentary side elevation of a motor vehicle including the novel stock chute arrangement incorporating the features of this invention.

As illustrative of this invention there is shown a conventional pickup truck comprising the usual drivers cab 10 and the rear wheels 11 having the rear fenders 12 and the pickup body 13 having side rails 14. On top of the body portion 13 is mounted the usual side frames comprising the upright members 15 and 16 suitably secured to the truck body 13 and having the cross members 17, 18, 19, and 20 rigidly secured thereto.

Figures 2, 3, 4:
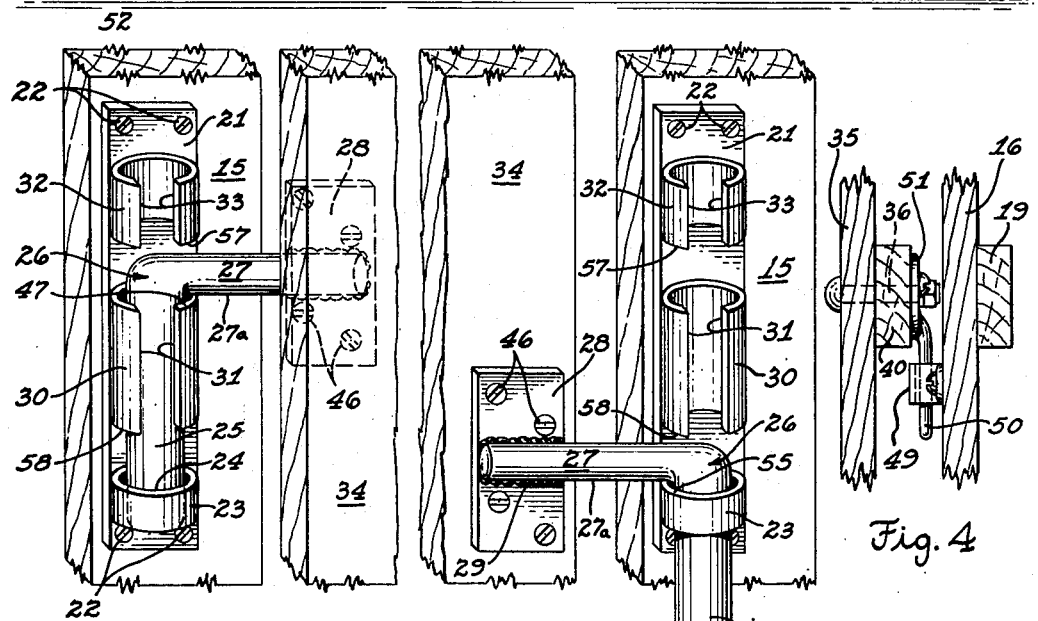
Fig. 2 is a fragmentary enlarged perspective view of the novel hinge structure at the time the chute sides are swung back in traveling position on the truck.
Fig. 3 is a view similar to Fig. 2 but showing the arrangement of the hinges at the time the stock chute is positioned for loading or unloading the truck.
Fig. 4 is an enlarged fragmentary view showing the locking means for securing the chute sides in traveling position on the truck body.

Since both sides of the truck are the same and the chute sides to be described are likewise identical, a detail description of one side of the vehicle with regard thereto will suffice for both. On the member 15 is fixed a novel hinge structure comprising the base plate 21 secured to the member 15 by suitable bolts or screws 22. To the lower portion of the base plate 21 is fixed a lower or third annular ring member 23 which is continuously engaged at all times in its bore 24 by the downwardly extending pin portion 25 of the member 26 which has at its upper portion a horizontally disposed arm 27 which is welded to a plate 28 by suitable weldment 29 as best seen in Figs. 2 and 3. The portion 25 of the member 26 is supported in another slotted intermediate or second cylindrical member 30 also secured to the base member 21 and having a slotted opening 31 of a width equal to the diameter portion 27 of the member 26, the portion 27 of the member 26 being smaller in diameter than the portion 25 so that when the member 26 is swung so that its arm 27 extends outwardly substantially perpendicular from the base plate 21 it may be readily slid up and down in the slot 31 in the member 30.

Above the member 30 is still another upper or first locking member 32 rigidly secured to the base plate 21 and having a slot 33 of the same width as the slot 31 in the member 30 to permit upward vertical sliding movement of the portion 27 of the member 26 therein when again the member 26 has its arm 27 pointing outwardly perpendicularly relative to the base plate member 21.

Figure 5:
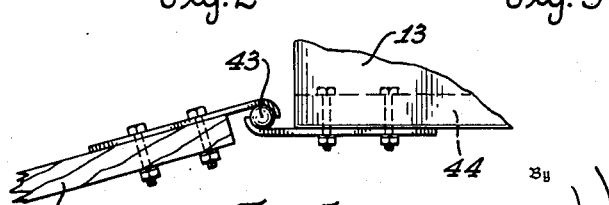
Fig. 5 is a fragmentary plan view showing the pivotal connection of the tail gate to the truck body.

The side frame members of the chute consist of a pair of vertical supports 34 and 35 which are connected together by pivotal connections at 36 by means of the cross members 37, 38, 39, 40 and 41. A tail gate 42 is pivotally mounted by any suitable means such as the detachable hinge connection 43 shown in Fig. 5 to the bottom 44 of the truck body 13 in any suitable manner. The upright members 34 of the sides of the chute are rigidly fixed to the plates 28 of the hinge member 26 by suitable bolts 46 as best seen in Figs. 2 and 3.

When in traveling position the hinge member 26 is positioned as shown in Fig. 2 with the under edge 27a of the hinge member 27 supported on the surface 47 of the member 30 with the member 25 being retained in the bore of the member 30 and further supported in the member 23 as described. Under these conditions the lower member 37 of the sides of the chute is positioned on top of the truck body side rails 14 and above the rear top surfaces 48 of the rear fenders 12 of the truck. The vertical members 35 of the side frames of the chute are secured to the vertical members 16 of the truck body by means of a suitable latch comprising a socket member 49 fixed to the members 16 and a locking pin 50 secured by a suitable bracket 51 to the members 35. The pin 50 is entered into the socket member 49 by swinging the side frame members upwardly which can be done due to the pivotal connections at 36 as described, and then entering the pin 50 into the socket 49 and letting the side frames come down to horizontal traveling position of the rail members 37 to 41 inclusive. Thus, in this position, the side frames are up and out of the way ready for traveling of the truck, the tail gate 42 being swung upwardly about its pivotal connection 43, Fig. 5, and latched in position by the entrance of the opening 52 in the tail gate over the locking pin 53 carried in the vertical members 15 of the truck body and then placing the usual lock pin 54 through a hole in the outer ends of the pins 53 behind the tail gate bottom to hold it also in traveling position.

When it is desired to arrange the chute for loading or unloading the truck, the latch arrangement 49—50, Fig. 4, is disengaged by raising the side frames about the pivotal connections 36 as described and then swinging the frame around to a position 90° straight out from the side of the truck. This causes the member 27 of the hinges shown in Fig. 2 to drop down through the slot 31 in the member 30 until the under surface 27a of the member 27 engages the top surface 55 of the member 23 of the hinges. This automatically causes the side frames to drop down to a position in proper alignment with the bottom 44 of the truck and with the tail gate 42. The side frames can then be swung 180° from their traveling position to that shown in Fig. 3 where the outer vertical members 35 are then moved further downwardly to engage the outer end of the tail gate 42 at its point of rest on the ground. A suitable locking pin 56 engages in the same opening 52 in the outer end of the tail gate that is utilized for holding the tail gate in upward traveling position, the side frame members 37 to 41 inclusive of the sides of the chute pivoting around the points 36 to allow this condition to take place. Thus, in this position the chute is ready for loading and unloading stock in the truck.

Referring particularly to Fig. 2 it will be noted that the member 32 has a surface 57 which prevents the member 27 of the hinges from coming up out of the position shown in Fig. 2 when in traveling position. However, when swinging the side frames to a position 90° in traveling position it is then possible to raise the gates up still further allowing the member 27 to pass up through the slots 33 for complete removal of the side frames of the chute from the truck if desired. It will be further noted that the surface 58 on the bottom of the member 30 of the hinge also prevents the member 27 from moving upwardly from its position shown in Fig. 3 during the stock loading operation so that here again the hinge is locked in operating position under those conditions.

Having thus fully set forth and described this invention what is claimed is:

1. In combination with a truck body having a floor, and upright side members on each side of said floor, a tail gate pivotally mounted for swinging movement about a horizontal axis on the rear edge of said floor, and side frame members to form a chute with said tail gate when lowered including hinge means for pivotally mounting said side frame members for swinging movement about a vertical axis on the rear of said truck body, said hinge means including a lower ring member, a ring member above said lower ring member having a vertically disposed slot for holding said side frame members in upper raised position above the fenders and side boards of the truck body and to automatically lower said side frame members when swung rearwardly over the edges of said lowered tail gate.

2. In combination with a truck body having a floor, and upright side members on each side of said floor, a tail gate pivotally mounted for swinging movement about a horizontal axis on the rear edge of said floor, and side frame members to form a chute with said tail gate when lowered including hinge means for pivotally mounting said side frame members for swinging movement about a vertical axis on the rear of said truck body, said hinge means including a lower ring member, a slotted ring member above said lower ring member for holding said side frame members in upper raised position above the fenders and side boards of the truck body and to automatically lower said side frame members when swung rearwardly over the edges of said lowered tail gate, and means to cause said side frame members to move angularly downwardly to engage the side edges of said tail gate, and locking means for securing the outer ends of said side frame members to the outer end of said tail gate.

3. In a stock chute for a motor vehicle, a pair of side frame members, hinge means for pivotally mounting said members to the rear portion of the truck body for horizontal swinging movement, a ring member to hold said side frame members when swung back against the sides of the truck body in an upward raised position of said side frames above the rear fenders of said truck, and further means in said hinges below said ring member to automatically cause said side frame members to be lowered to a predetermined position when swung rearwardly of said truck body comprising a vertically disposed slot in said intermediate member, and a third spaced annular ring member below said intermediate member.

4. In a stock chute for a motor vehicle, a pair of side frame members, hinge means for pivotally mounting said members to the rear portion of the truck body for horizontal swinging movement including a ring member having a vertical slot to hold said side frame members when swung back against the sides of the truck body in an upward raised position of said frames above the rear fenders of said truck, and an annular ring member in said hinges located below said ring member having a vertical slot to automatically cause said side frame members to be lowered to a predetermined position when swung rearwardly of said truck body, tail gate means swingable from an upper closed position to a lower position to form a gang-plank for said chute, and means for pivotally mounting cross slat members in said side frames on vertical end pieces thereof so that said side frame members when swung to lowered position on said hinges may be distended downwardly at their outer end to conform to the angular disposition of said tail gate when in lowered position.

5. In a stock chute for a motor vehicle, a pair of side frame members, hinge means for pivotally mounting said members to the rear portion of the truck body for horizontal swinging movement including a ring member having a vertical slot to hold said side frame members when swung back against the sides of the truck body in an upward raised position of said side frames above the rear fenders of said truck, and further means including an annular ring below said ring member having a vertical slot in said hinge means to automatically cause said side frame members to be lowered to a predetermined position when swung rearwardly of said truck body, tail gate means swingable from an upper closed position to a lower position to form a gang-plank for said chute, and means for pivotally mounting cross slat members in said side frames on vertical end pieces thereof so that said side frame members when swung to lowered position on said hinges may be distended downwardly at their outer end to conform to the angular disposition of said tail gate when in lowered position, and means for locking the outer end of said side frame members to the outer edge of said tail gate when in lowered position.

6. In a stock chute for a motor vehicle, a pair of side frame members, hinges for pivotally mounting said members to the rear portion of the truck body for horizontal swinging movement including a slotted ring member to hold said side frame members when swung back against the sides of the truck body in an upward raised position of said side frames above the rear fenders of said truck, and further means including an annular ring member below said first mentioned slotted ring member in said hinges to automatically cause said side frame members to be lowered to a predetermined position when swung rearwardly of said truck body, tail gate means swingable from an upper closed position to a lower position to form a gang-plank for said chute, and means for pivotally mounting cross slat members in said side frames on vertical end pieces thereof so that said side frame members when swung to lowered position on said hinges may be distended downwardly at their outer end to conform to the angular disposition of said tail gate when in lowered position and means for locking the outer end of said side frame members to the outer edge of said tail gate when in lowered position, and means for locking said side frame members to the front portion of said truck body when swung to raised position along the side of said truck.

7. In a stock chute for a motor vehicle, a pair of side frame members, hinges for pivotally mounting said member to the rear portion of the truck body for horizontal swinging movement including a slotted ring member to hold said side frame members when swung back against the sides of the truck body in an upward raised position of said side frames above the rear fenders of said truck, and further means including an annular ring member below said intermediate slotted ring member in said hinges to automatically cause said side frame members to be lowered to a predetermined position when swung rearwardly of said truck body, tail gate means swingable from an upper closed position to a lower position to form a gang-plank for said chute, and means for pivotally mounting cross slat members in said side frames on vertical end pieces thereof so that said side frame members when swung to lowered position on said hinges may be distended downwardly at their outer end to conform to the angular disposition of said tail gate when in lowered position and means for locking the outer end of said side frame members to the outer edge of said tail gate when in lowered position, and means for locking said side frame members to the front portion of said truck body when swung to raised position along the side of said truck, and means for locking said tail gate to the rear portion of the truck body when in raised position.

8. In a hinge structure for a stock chute for a motor vehicle comprising a plate, a first upper circular stop member fixed to said plate, a vertically disposed slot in said member, a second spaced member located below said first member, a slot in said second member, and a third spaced member comprising a continuous annular ring fixed to said plate, an L-shaped hinge piece having an enlarged portion engageable in the bores of all three of said first, second, and third members and a horizontally disposed smaller diameter member adapted to slide freely in said slotted portions in said first and second members, means for securing said plate to the rear upright portion of the body of a vehicle, and means for securing said reduced horizontal portion of said hinge member to the chute side members of a stock chute for a motor vehicle.

HARRY G. TROTH.
FAYE G. DAMMANN.

REFERENCES CITED

The following references are of record in the file of this patent:

UNITED STATES PATENTS

| Number | Name | Date |
| --- | --- | --- |
| 711,142 | Williams | Oct. 14, 1902 |
| 1,145,759 | Dwyer | July 6, 1915 |
| 1,384,713 | Stephens | July 12, 1921 |
| 2,222,965 | Voelkel | Nov. 26, 1940 |

FOREIGN PATENTS

| Number | Country | Date |
| --- | --- | --- |
| 387,623 | Great Britain | Feb. 9, 1933 |
| 503,104 | Great Britain | Mar. 31, 1939 |